(12) United States Patent
Wang

(10) Patent No.: US 9,651,103 B2
(45) Date of Patent: May 16, 2017

(54) DISC BRAKE

(71) Applicant: Hsin-Fa Wang, Lukang Township, Changhua County (TW)

(72) Inventor: Hsin-Fa Wang, Lukang Township, Changhua County (TW)

( * ) Notice: Subject to any disclaimer, the term of this patent is extended or adjusted under 35 U.S.C. 154(b) by 0 days.

(21) Appl. No.: 15/148,504

(22) Filed: May 6, 2016

(65) Prior Publication Data

US 2017/0023077 A1    Jan. 26, 2017

(30) Foreign Application Priority Data

Jul. 24, 2015    (TW) .............................. 104211964 U

(51) Int. Cl.
| | | |
|---|---|---|
| *B62L 3/02* | (2006.01) | |
| *F16D 65/00* | (2006.01) | |
| *B62L 1/00* | (2006.01) | |
| *F16D 55/228* | (2006.01) | |
| *F16D 55/00* | (2006.01) | |
| *F16D 55/225* | (2006.01) | |
| *F16D 125/60* | (2012.01) | |
| *F16D 125/36* | (2012.01) | |
| *F16D 125/64* | (2012.01) | |

(52) U.S. Cl.
CPC .......... *F16D 65/0075* (2013.01); *B62L 1/005* (2013.01); *F16D 55/228* (2013.01); *F16D 55/225* (2013.01); *F16D 2055/002* (2013.01); *F16D 2125/36* (2013.01); *F16D 2125/60* (2013.01); *F16D 2125/64* (2013.01)

(58) Field of Classification Search
CPC ...... F16D 55/38; F16D 65/0075; F16D 65/12; B62L 1/00; B62L 1/005; B62L 1/14; B62L 1/065
USPC .................. 188/24.12, 24.22, 26, 72.7, 72.8
See application file for complete search history.

(56) References Cited

U.S. PATENT DOCUMENTS

| | | | | |
|---|---|---|---|---|
| 5,979,609 | A  * | 11/1999 | Tsai .......................... | B62L 1/00 188/26 |
| 6,109,397 | A  * | 8/2000 | Chen ......................... | B62L 1/14 188/24.12 |
| 6,394,236 | B1 * | 5/2002 | Matsuishita .............. | B62L 1/00 188/24.22 |
| 6,659,234 | B1 * | 12/2003 | Huang ..................... | B60T 1/065 188/26 |
| 6,684,982 | B2 * | 2/2004 | Kariyama ............... | B62L 1/005 188/196 M |
| 7,735,612 | B2 * | 6/2010 | Pozivilko ................ | F16D 55/38 188/71.5 |

(Continued)

*Primary Examiner* — Christopher Schwartz
(74) *Attorney, Agent, or Firm* — Egbert Law Offices, PLLC

(57) ABSTRACT

A disc brake includes a first casing and a second casing abutting each other to define a receiving space for partially and separately receiving a brake disc. The first casing and the second casing respectively has an axial pushing apparatus mounted therein. Each axial pushing apparatus has a first end outwardly extending through the first/second casing and a second end having a lining pad mounted thereon. The first end of each of the axial pushing apparatus is respectively connected to a lever that is connected to a brake cable. The two axial pushing apparatus inwardly moves the two brake linings to synchronously clamp the two opposite sides of the brake disc for speeding down or stop the bicycle when the brake cable pulls the lever.

6 Claims, 12 Drawing Sheets

(56) References Cited

U.S. PATENT DOCUMENTS 8,662,260 B2 * 3/2014 Baldeosingh ........... F16D 65/12
188/72.7

* cited by examiner

DISC BRAKE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a brake, and more particularly to a disc brake for bicycle.

2. Description of Related Art Including Information Disclosed Under 37 CFR 1.97 and 37 CFR 1.98.

A bicycle is an important equipment for being used on a short-range movement. The bicycle becomes more and more popular in our daily life and every family due the features of environmental protection and leisure.

Bicycles are non-mainstream transportation, however a braking device is necessary just like any other mainstream transportation because the braking device is very important to road-traffic safety. Common braking devices are divided into two kinds including drum brake and disc brake. The two kinds of brake device use brake lining to rub the drum or disc for causing friction to speed down or stop. Generally, the braking effect of the disc brake is better than that of the drum brake. As a result, a high grade bicycle or a bicycle having special safety concern usually uses the disc brake for promoting the additional value of the bicycles.

However, the conventional disc brake in accordance with the prior including the following disadvantages.

The conventional disc brake has complex structures. Accordingly, the material cost, assembling cost and the maintain cost are respectively raised.

The disc brake is assembled in a small space such that many structures need to be minimized. As a result, the minimized spring may not provide enough restitution force to the lining pad and the lining pad may not be backward moved, timely.

The elements of the conventional disc brake are assembled from interior to exterior. Consequently, the assembling margin is gradually reduced and the assembling difficulty is gradually raised.

The present invention has arisen to mitigate and/or obviate the disadvantages of the conventional disc brake.

BRIEF SUMMARY OF THE INVENTION

The main objective of the present invention is to provide an improved disc brake that simplifies the structures of the conventional disc brake.

To achieve the objective, the disc brake in accordance with the present invention comprises at least one casing having an axial pushing apparatus mounted therein. The axial pushing apparatus has a first end outwardly extending through the at least one casing and a second end having a lining pad mounted thereon. The first end of the axial pushing apparatus is connected to a lever that is connected to a brake cable, wherein the axial pushing apparatus inwardly moves the brake linings to a brake disc for providing a brake effect when the brake cable pulls the lever.

The axial pushing apparatus includes a feeding device mounted in the at least one casing and the feeding device includes a first pushing element and a second pushing element co-axially corresponding to each other, wherein the first pushing element is reciprocally axially moved relative to the at least one casing and the second pushing element is reciprocally rotated relative to the at least one casing for axially driving the first pushing element. At least two bores are longitudinally defined in first pushing element and each of the at least two bores has a spring received therein, wherein each spring has two opposite ends respectively abutting against a bottom of a corresponding one of the at least two bores and an interior of the at least one casing for providing a restitution force to the first pushing element after being moved toward the brake disc.

Further benefits and advantages of the present invention will become apparent after a careful reading of the detailed description with appropriate reference to the accompanying drawings.

DETAILED DESCRIPTION OF THE INVENTION

Figure 1:
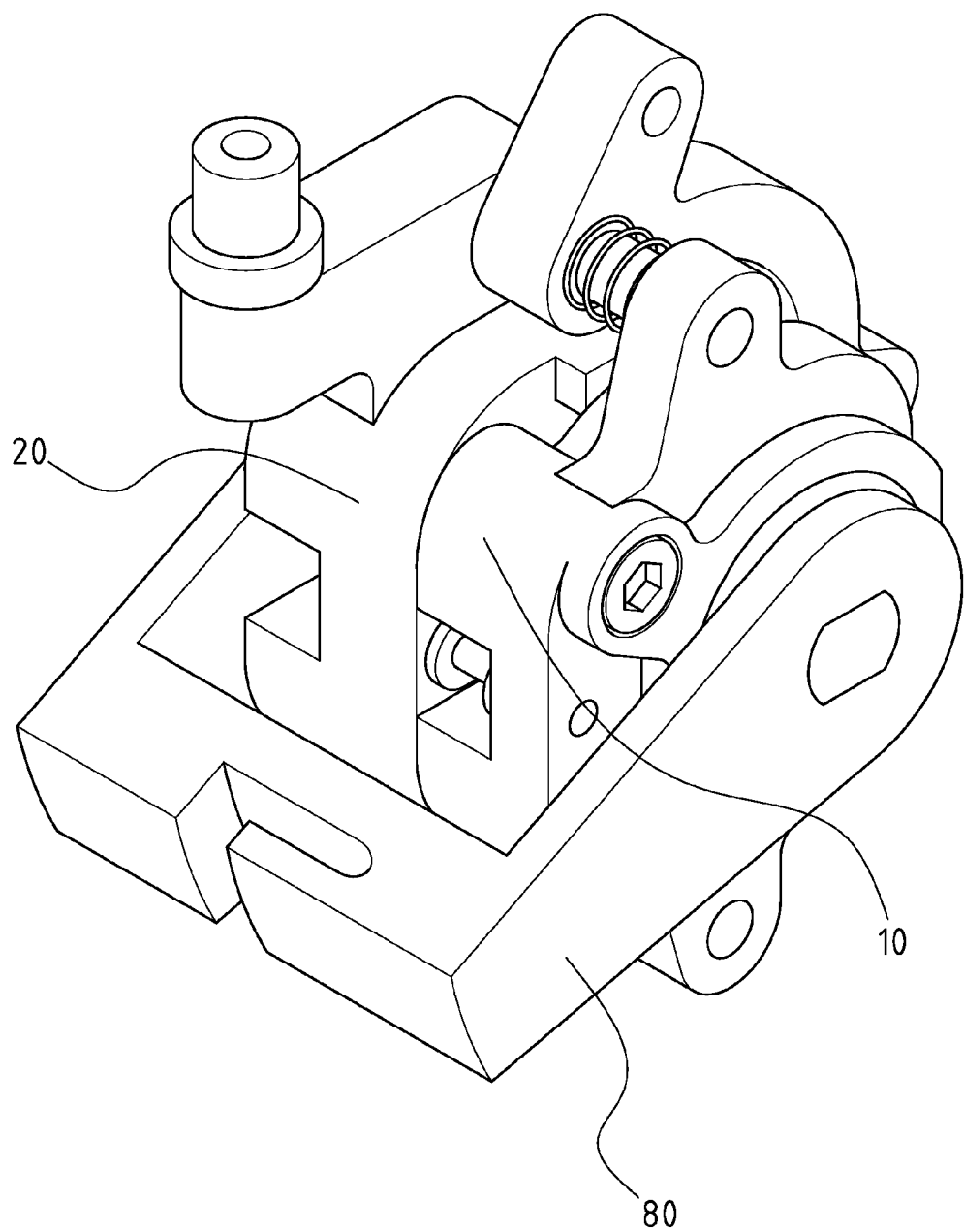
FIG. 1 is a perspective view of a disc brake in accordance with the present invention.
Figure 2:
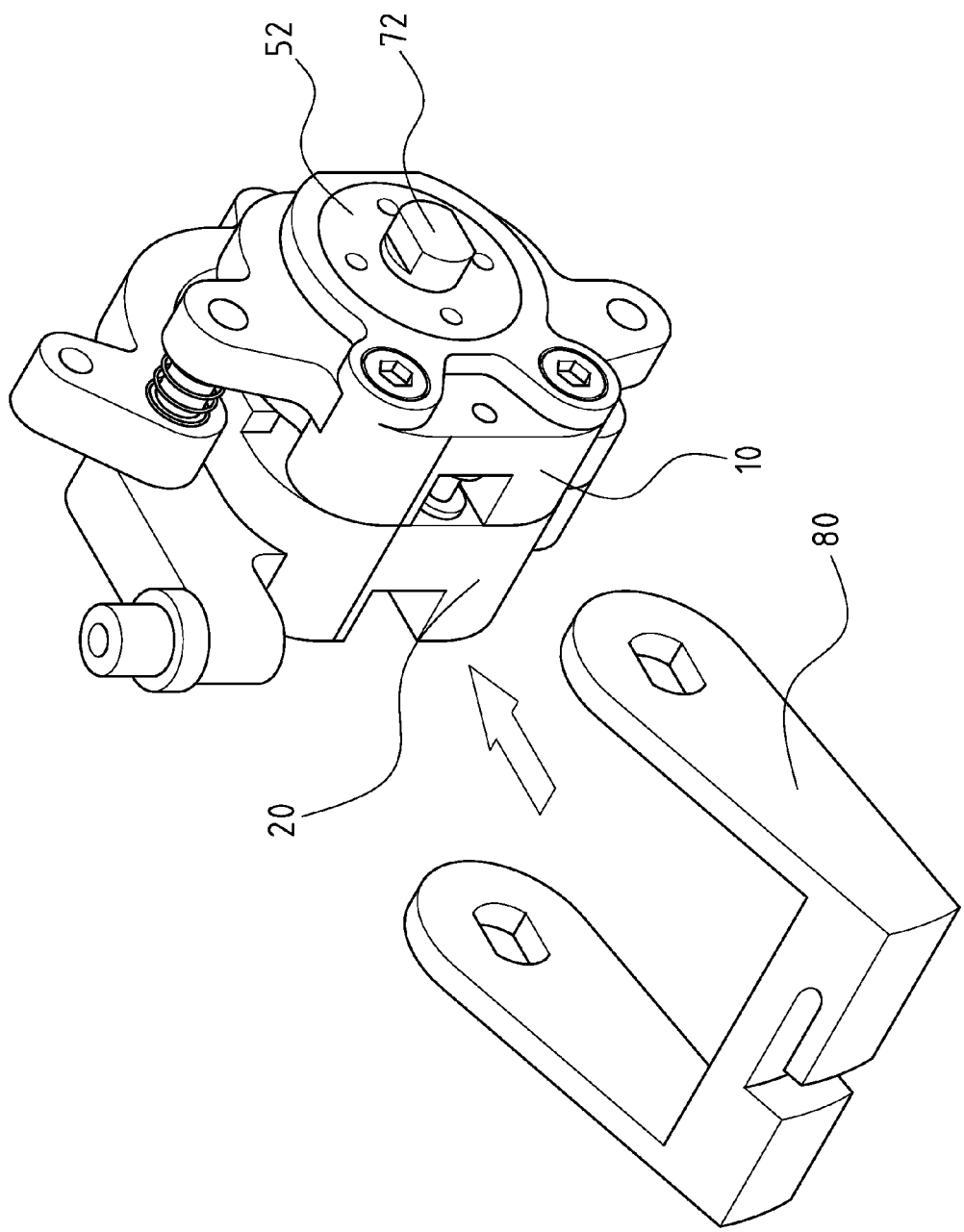
FIG. 2 is an exploded perspective view of a lever of the disc brake in FIG. 1.
Figure 3:
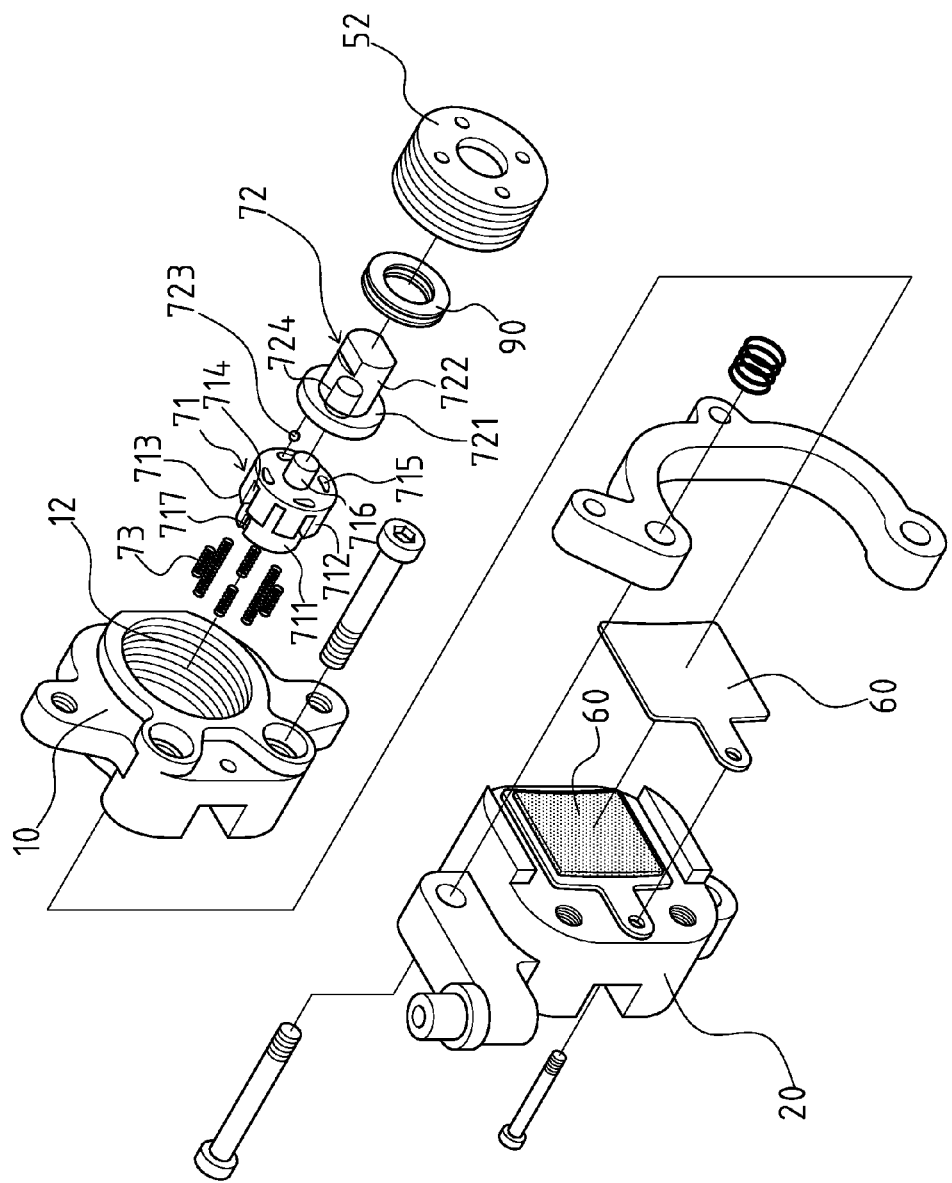
FIG. 3 is an exploded perspective view of the disc brake in accordance with the present invention.
Figure 4:
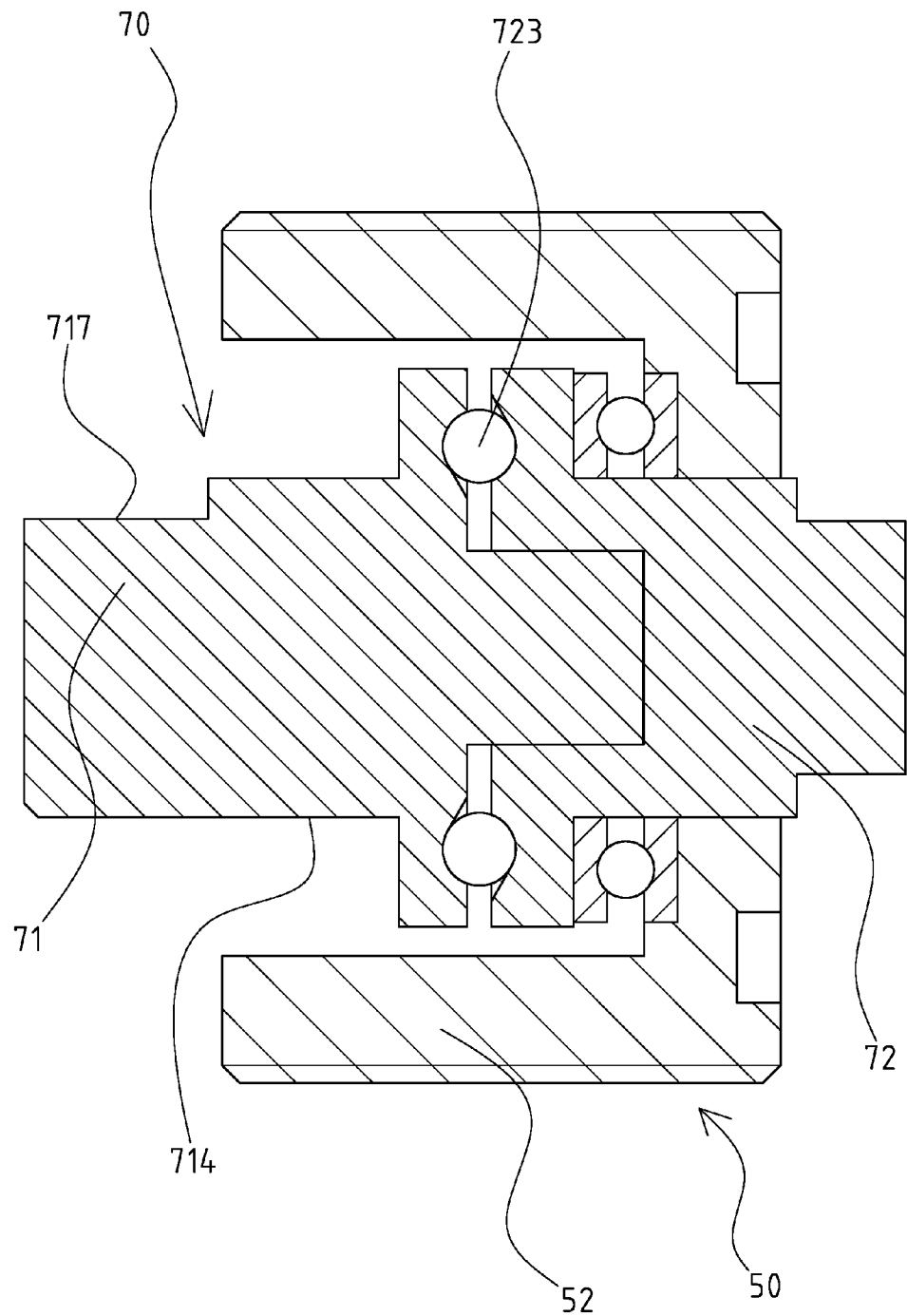
FIG. 4 is a cross-sectional view of an axial pushing apparatus of the disc brake in accordance with the present invention.
Figure 5:
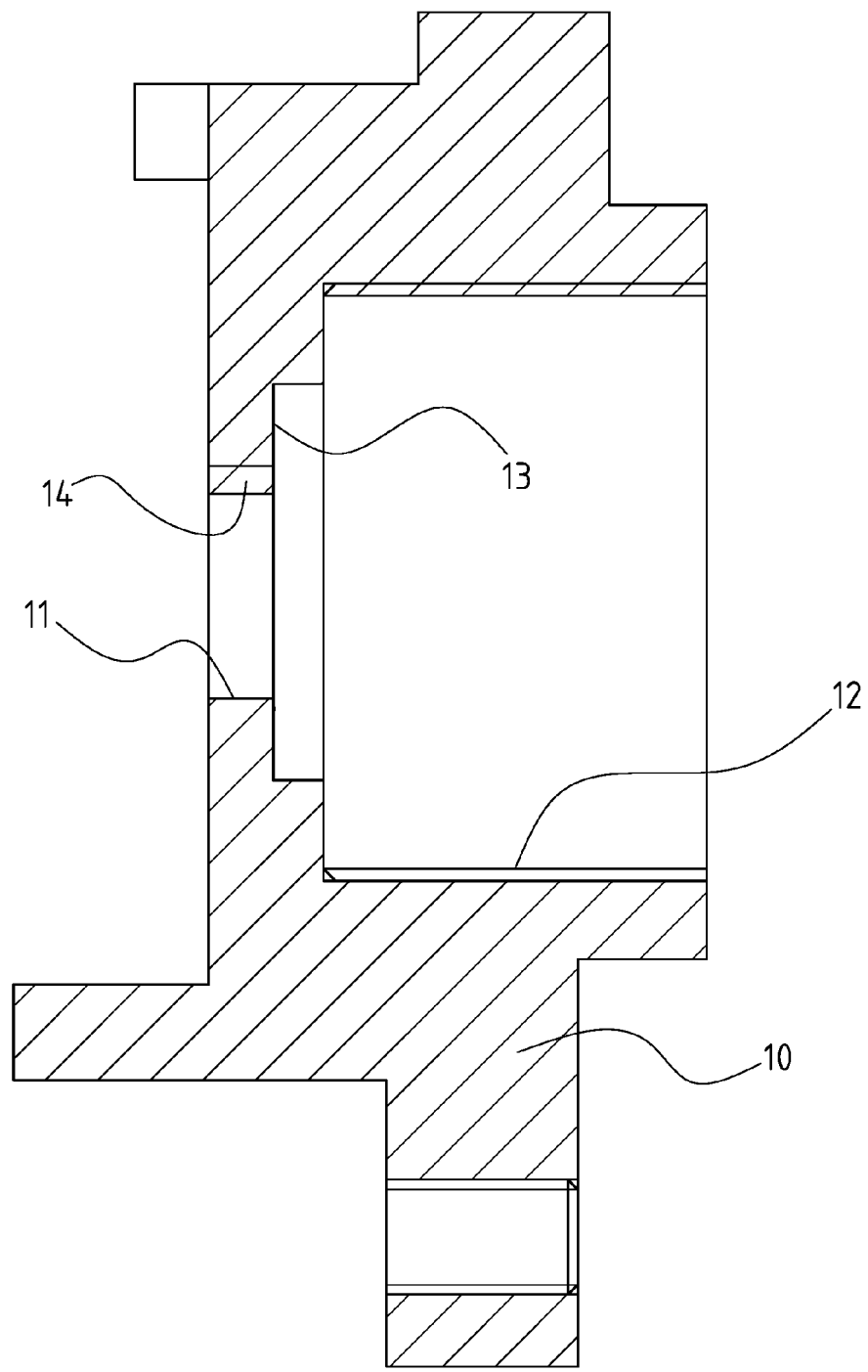
FIG. 5 is a cross-sectional view of a first casing of the disc brake in accordance with the present invention.
Figure 6:
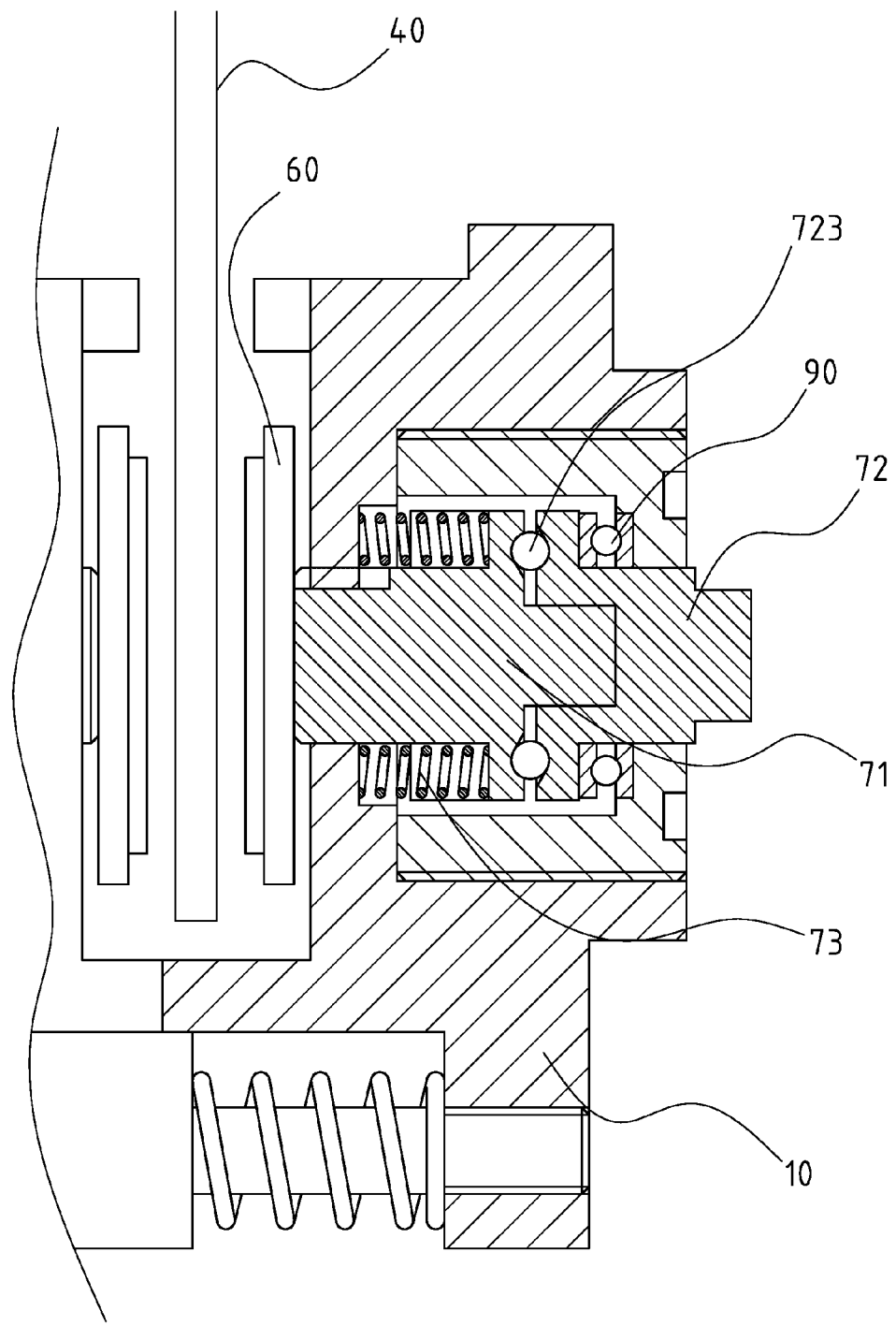
FIG. 6 is a partially cross-sectional view of the disc brake in accordance with the present invention.

Referring to the drawings and initially to FIGS. 1-6, a disc brake in accordance with the present invention comprises a first casing 10 and a second casing 20 abutting each other to define a receiving space 30 for partially and separately receiving a brake disc 40. The first casing 10 and the second casing 20 respectively has an axial pushing apparatus 40 mounted therein. Each axial pushing apparatus 40 has a first end outwardly extending through the first/second casing 10/20 and a second end having a lining pad 60 mounted thereon. The first end of each of the two axial pushing apparatus 50 is respectively connected to a lever 50 that is connected to a brake cable (not shown). The two axial pushing apparatus 50 inwardly moves the two brake linings 60 to synchronously clamp the two opposite sides of the brake disc 40 for speeding down or stop the bicycle when the brake cable pulls the lever 50.

The internal structures of the first casing 10 are the same as that of the second casing 20 such that only the first casing 10 and the axial pushing apparatus 50 are described, hereinafter.

The first casing 10 includes a through hole 11 and a threaded hole 12 sequentially defined therein, wherein the through hole 11 and the threaded hole 12 co-axially correspond to each other. The through hole 11 has a diameter smaller than that of the threaded hole 12 such that a first shoulder 13 is formed between the through hole 11 and the threaded hole 12. The first casing 10 has at least one key 14 radially extending from an inner periphery of the through hole 11.

The axial pushing apparatus 50 includes a feeding device 70 mounted in the threaded hole 12 and a cap 52 screwed into the threaded hole 12 for holding the feeding device 70 in place. The feeding device 70 includes a first pushing element 71 and a second pushing element 72 co-axially corresponding to each other, wherein the first pushing element 71 is reciprocally axially moved relative to the first casing 10 and the second pushing element 72 is reciprocally rotated relative to the cap 52 for axially driving the first pushing element 71.

The first pushing element 71 is divided into a first section 711 and a second section 712 co-axially corresponding to each other, wherein the first section 711 has a diameter smaller than that of the second section 712 such that a second shoulder 713 is formed between the first section 711 and the second section 712. At least two bores 714 are longitudinally defined in the second section 712 and extends to the second shoulder 713. Each of the at least two bores 714 has a spring 73 received therein, wherein each spring 73 has two opposite ends respectively abutting against a bottom of a corresponding one of the at least two bores 714 and the first shoulder 13 for providing a restitution force to the first pushing element 71 after being moved toward the brake disc 40. The first pushing element 71 has multiple first feeding structures 715 disposed thereon and corresponding to the second pushing element 72, and a stub 716 centrally extending therefrom toward to the second pushing element 72. At least one keyway 717 is radially defined in the first section 711 for slidably receiving the at least one key 14 such that the first pushing element 71 does not be rotated relative to the first casing 10.

Figure 7:
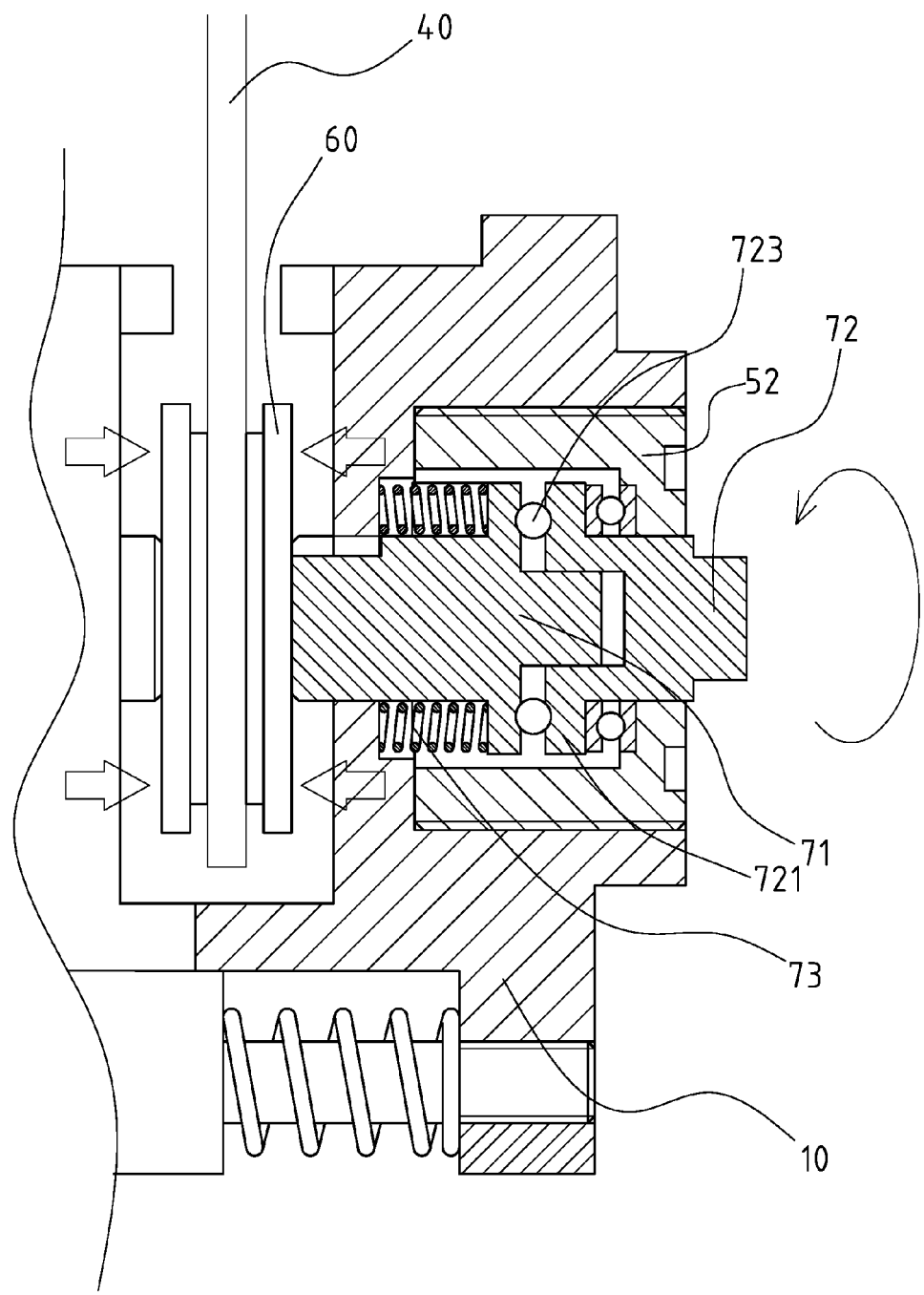
FIG. 7 is an operational view of the disc brake in accordance with the present invention.

Further with reference to FIG. 7, the second pushing element 72 includes a plate 721 abutting against the second section 712 of the first pushing element 71 and a shaft 722 centrally extending from the plate 721. The plate 721 has multiple second feeding structures 723 disposed thereon, wherein each second feeding structure 723 is coupled to a corresponding one of the multiple first feeding structures 715. The shaft 722 has a distal end mounted into the lever 80. The first feeding element 71 is moved toward the brake disc 40 and the springs 73 are compressed for providing the braking effect due to the coupled first feeding structures 715 and the second feeding structures 723 when the lever 80 is pulled by the brake cable and the second pushing element 72 is rotated relative to the first pushing element 71. The first pushing element 71 is moved to its original position, the second pushing element 72 is rotated to its original position and the lining pad 60 is separated from the brake disc 40 due to the restitution force of the springs 73 when the lever 80 is released. The second pushing element 72 includes a central hole 724 defined therein for rotatably receiving the stub 716 and maintaining the co-axial connection between the first pushing element 71 and the second pushing element 72. A bearing 90 is sleeved on the shaft 722 and disposed between the second pushing element 72 and the cap 52 such that the second pushing element 72 is smoothly rotated relative to the cap 52.

Figure 8:
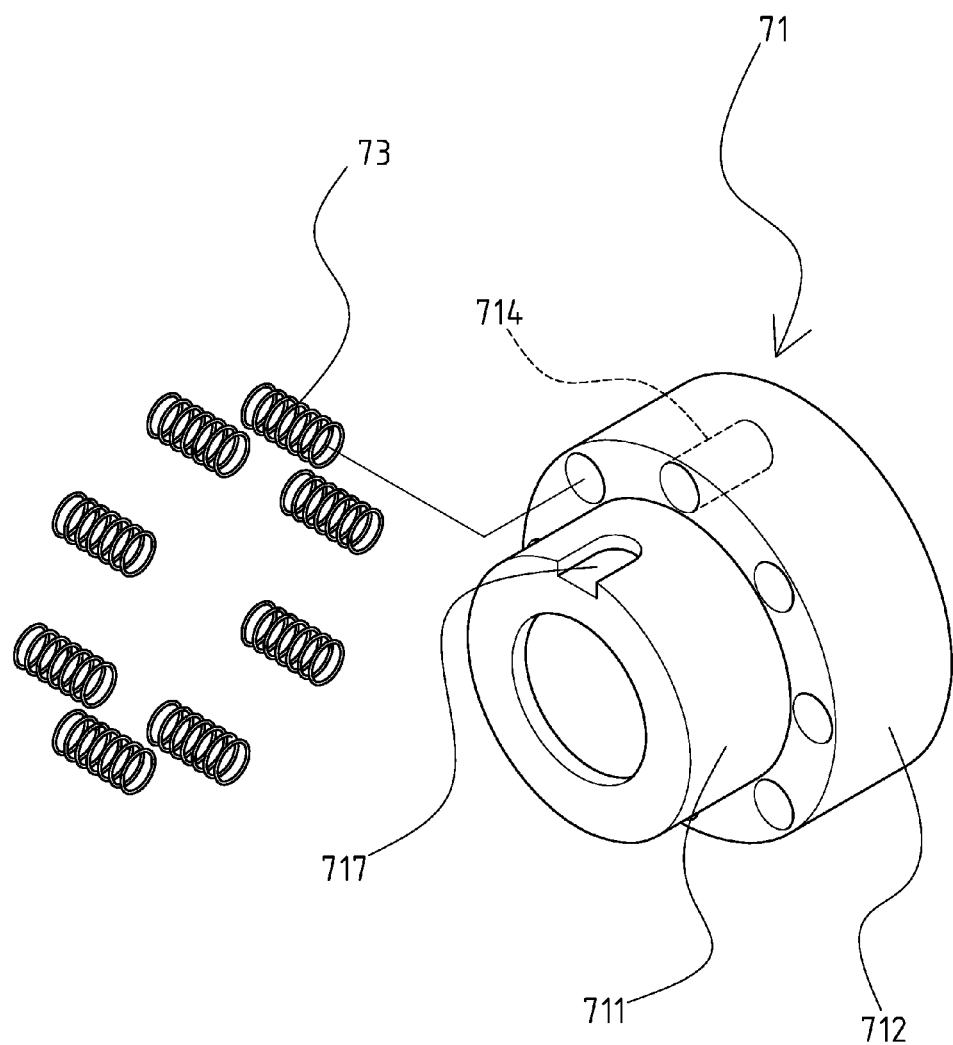
FIG. 8 is a partially exploded perspective view of a second embodiment of the disc brake in accordance with the present invention.

With reference to FIG. 8 that shows a second embodiment of the disc brake in accordance with the present invention, in this embodiment, the bore 714 has a completely round cross-section.

Figure 9:
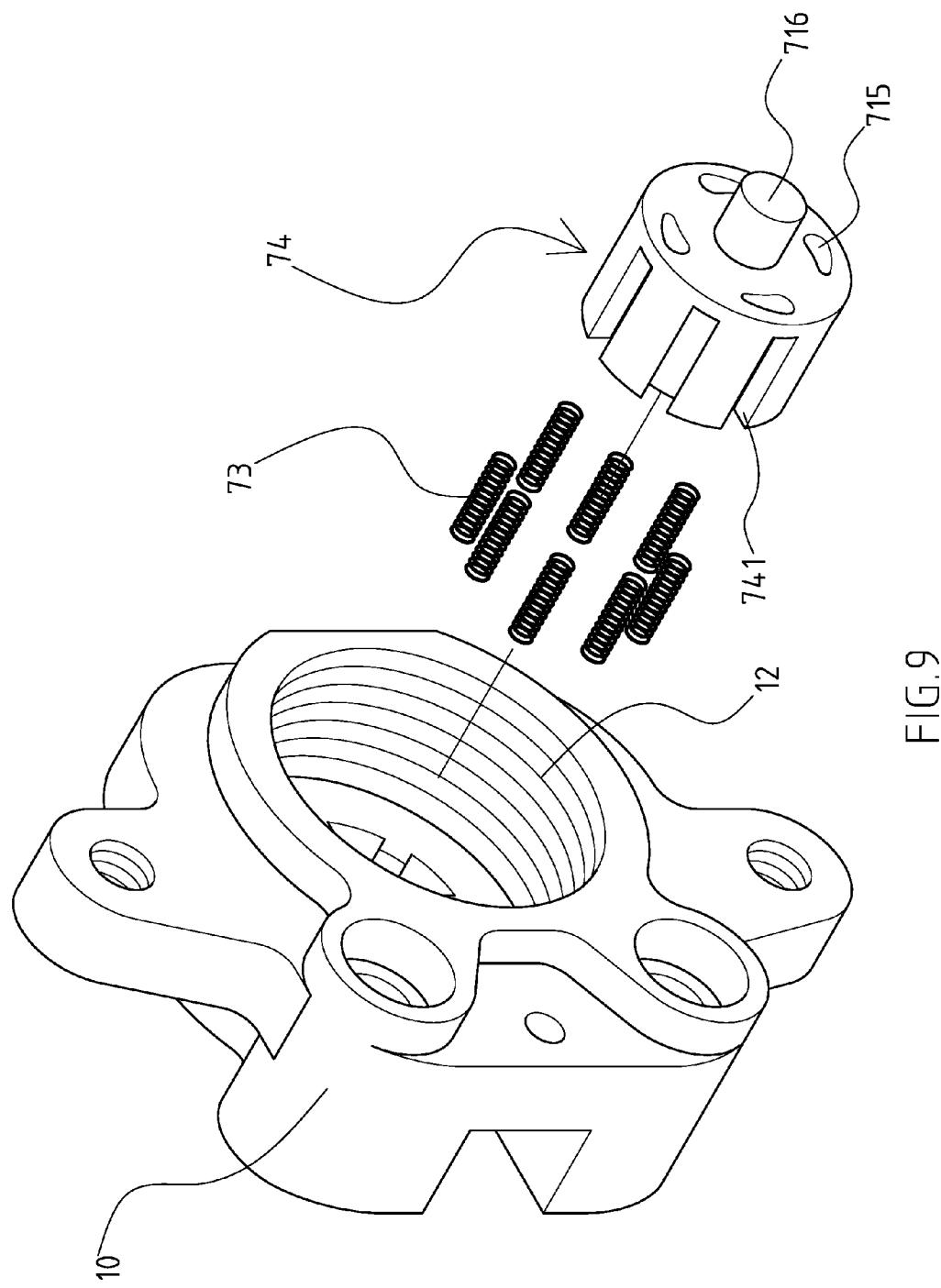
FIG. 9 is a partially exploded perspective view of a third embodiment of the disc brake in accordance with the present invention.
Figure 10:
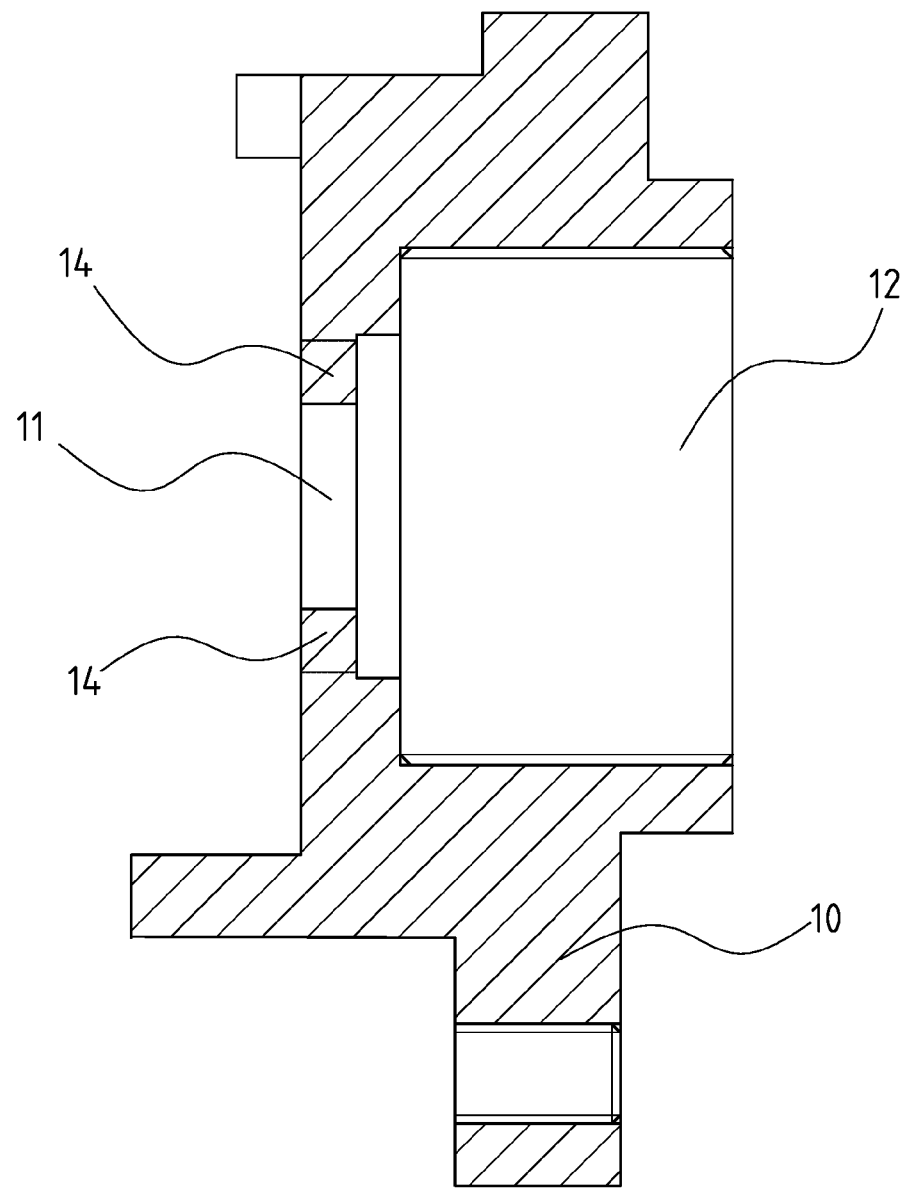
FIG. 10 is a cross-sectional view of a casing of the third embodiment of the disc brake in accordance with the present invention.
Figure 11:
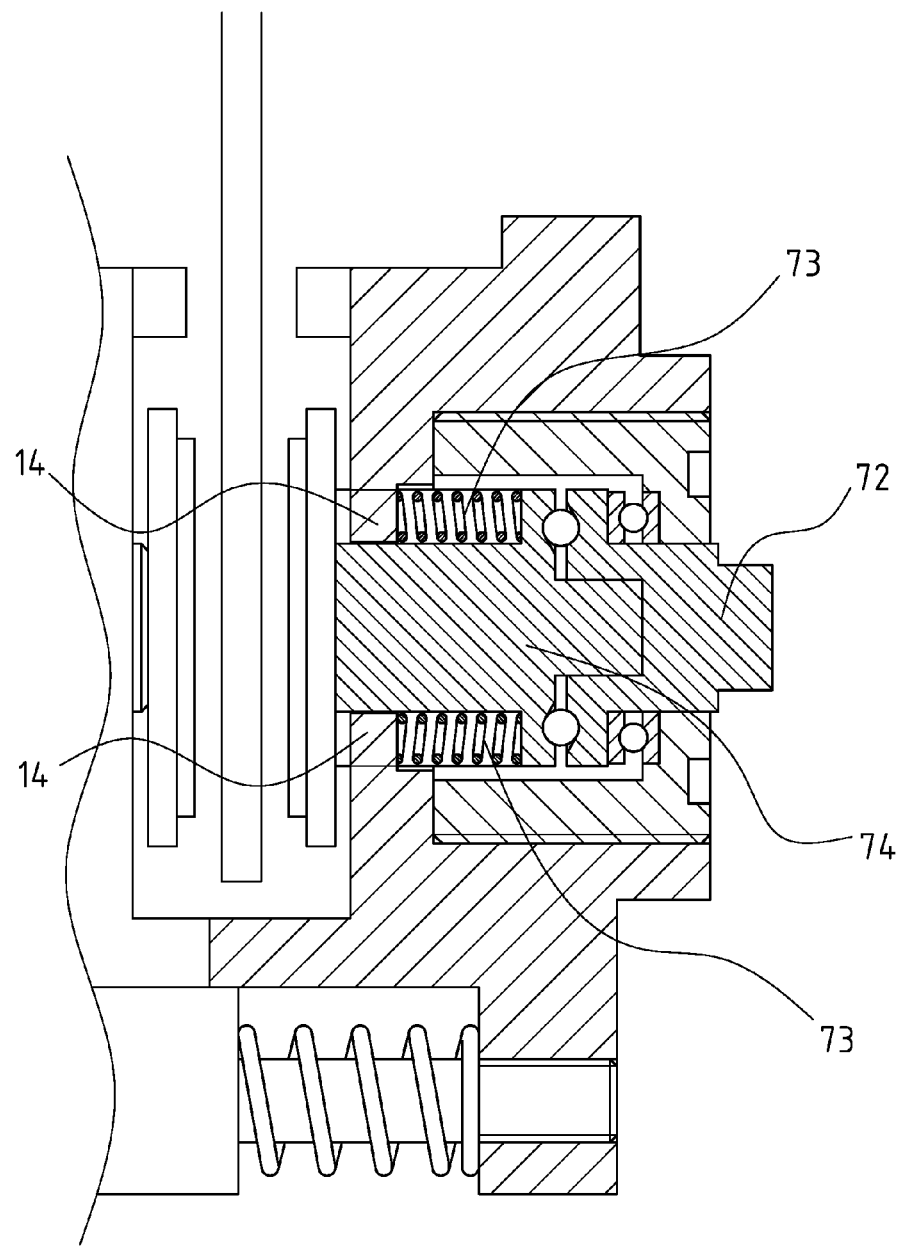
FIG. 11 is a partially cross-sectional view of the third embodiment of the disc brake in accordance with the present invention.

With reference to FIGS. 9-11 that show a third embodiment of the disc brake in accordance with the present invention, in this embodiment, the first casing 10 has at least two keys 14 radially extending from the inner periphery of the through hole 11. The first pushing element 74 is a cylinder and has at least two bores 741 longitudinally defined therein, wherein each bore 741 longitudinally extends to a distal face of the first pushing element 74 relative to the through hole 11 in the first casing 10 and laterally extending to an outer periphery of the first pushing element 74. Each bore 741 has a spring 73 received therein, wherein each spring 73 has a length greater than a depth of each of the at least two bores 741. Each key 14 extends into a corresponding one the at least two bores 741 for compressing a corresponding one of the springs 731 and preventing the first pushing element 74 from being rotated relative to the first casing 10. In this preferred embodiment, the first pushing element 74 has a stub 716 centrally extending therefrom and rotatably received in the second pushing element 72 as described in the first preferred embodiment, hereinbefore.

As usual, the disc brake uses two lining pads 60 for abutting against two opposite sides of the brake disc 40 for providing a great braking effect. However, one lining pad 60 can provide a braking effect enough for braking a general bicycle. Consequently, for used on a general bicycle, one of first/second casing 10/20, one axial pushing apparatus 50 and one lining pad 60 are necessary for reducing manufacturing cost.

Figure 12:
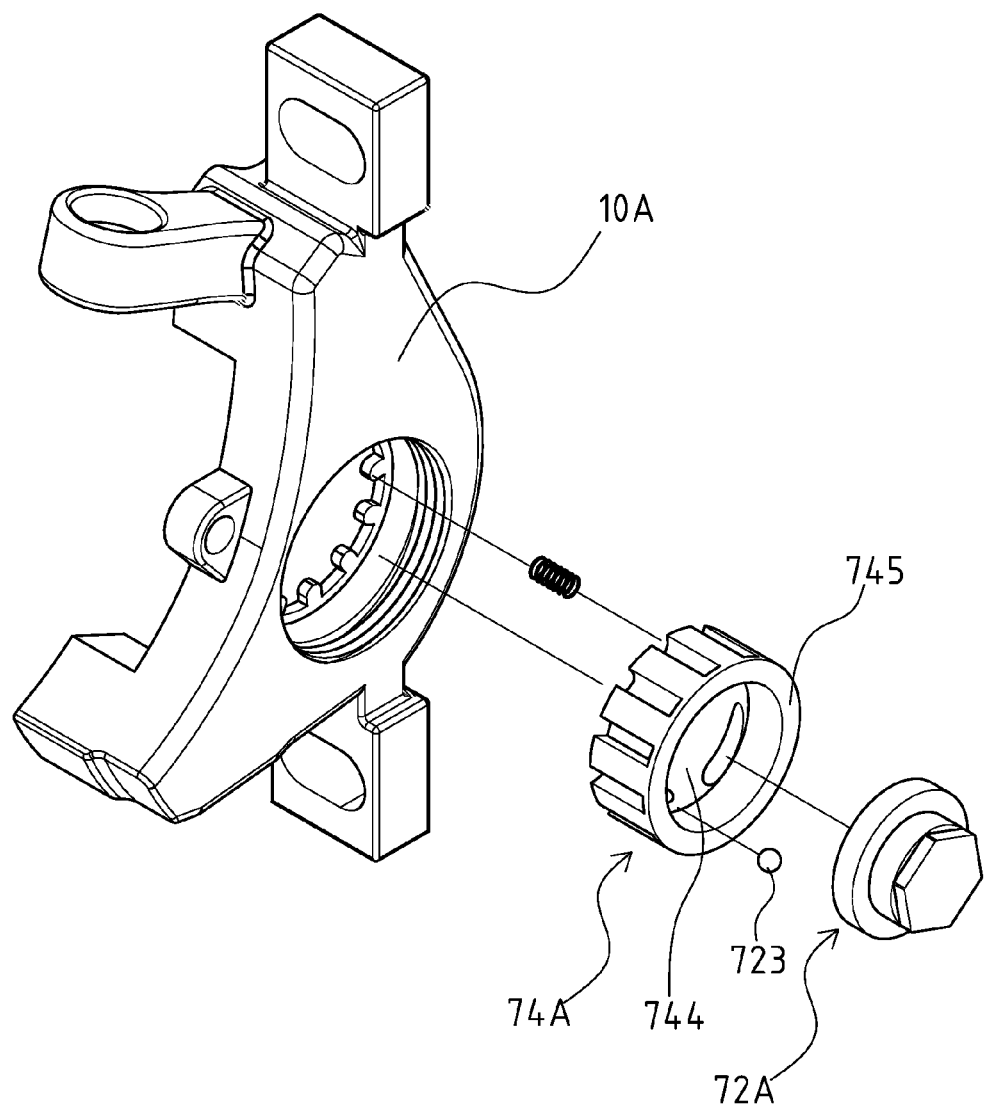
FIG. 12 is a partially exploded perspective view of a fourth embodiment of the disc brake in accordance with the present invention.

With reference to FIG. 12 that shows a fourth embodiment of the disc brake in accordance with the present invention, in this embodiment, the first pushing element 74A has a skirt 745 longitudinally extending therefrom for defining a cavity 744, wherein the second pushing element 72A is partially and rotatably received in the cavity 744. Accordingly, the rotated second pushing element 72A longitudinally pushed the first pushing element 74A by the second feeding structure 723 and the first pushing element 74A is reciprocally moved relative to the first casing 10A.

As described above, the disc brake in accordance with the present invention includes the following advantages. The disc brake of the present invention simplifies the structures of the conventional disc brake. The assembling direction of the disc brake of the present invention is opposite to the conventional disc brake such that the assembling difficulty is reduced. In addition, the restitution force of the first pushing element is adjusted relative to the number of the spring for providing various braking effects. Consequently, the disc brake in accordance with the present invention provides an accurate braking action and has a long used life.

Although the invention has been explained in relation to its preferred embodiment, it is to be understood that many other possible modifications and variations can be made without departing from the spirit and scope of the invention as hereinafter claimed.

I claim:

1. A disc brake comprising at least one casing having an axial pushing apparatus mounted therein, the axial pushing apparatus having a first end outwardly extending through the at least one casing and a second end having a lining pad mounted thereon, the first end of the axial pushing apparatus connected to a lever that is connected to a brake cable, wherein the axial pushing apparatus inwardly moves the brake linings to a brake disc for providing a brake effect when the brake cable pulls the lever, wherein:

the axial pushing apparatus includes a feeding device mounted in the at least one casing and the feeding device includes a first pushing element and a second pushing element co-axially corresponding to each other, wherein the first pushing element is reciprocally axially moved relative to the at least one casing and the second pushing element is reciprocally rotated relative to the at least one casing for axially driving the first pushing element; and at least two bores are longitudinally defined in the first pushing element, each of the at least two bores having a spring received therein, wherein each spring has two opposite ends respectively abutting against a bottom of a corresponding one of the at least two bores and an interior of the at least one casing for providing a restitution force to the first pushing element after being moved toward the brake disc.

2. The disc brake as claimed in claim 1, wherein the at least one casing includes a through hole and a threaded hole sequentially defined therein and co-axially corresponding to each other, the through hole having a diameter smaller than that of the threaded hole such that a first shoulder is formed between the through hole and the threaded hole; and the first pushing element is divided into a first section and a second section co-axially corresponding to each other, wherein the first section has a diameter smaller than that of the second section such that a second shoulder is formed between the first section and the second section, the at least two bores longitudinally defined in the second shoulder and each spring having two opposite ends respectively abutting against a bottom of a corresponding one of the at least one bores and the first shoulder.

3. The disc brake as claimed in claim 2, wherein each bore laterally extends to an outer periphery of the second section of the first pushing element.

4. The disc brake as claimed in claim 3, wherein the at least one casing has at least one key radially extending from an inner periphery of the through hole and the first pushing element has at least one keyway radially defined in the first section for slidably receiving the at least one key and prevent the first pushing element from being rotated relative to the at least one casing.

5. The disc brake as claimed in claim 2, wherein the at least one casing has at least one key radially extending from an inner periphery of the through hole and the first pushing element has at least one keyway radially defined in the first section for slidably receiving the at least one key and prevent the first pushing element from being rotated relative to the at least one casing.

6. The disc brake as claimed in claim 1, wherein the at least one casing includes a through hole and a threaded hole sequentially defined therein and co-axially corresponding to each other, the axial pushing apparatus including a cap screwed into the threaded hole for holding the feeding device in place; the at least one casing including at least two keys radially extending from an inner periphery of the through hole, each bore longitudinally extending to a distal face of the first pushing element relative to the through hole in the first casing, each key extending into a corresponding one the at least two bores for compressing a corresponding one of the springs and preventing the first pushing element from being rotated relative to the at least one casing.

* * * * *